（12）United States Patent
Hinkley

(10) Patent No.: US 8,972,993 B2
(45) Date of Patent: Mar. 3, 2015

(54) METHOD AND SYSTEM FOR SCHEDULING COMPUTER PROCESSES USING A COMMON SCHEDULING INTERFACE

(75) Inventor: Paul A. Hinkley, Lombard, IL (US)

(73) Assignee: CA, Inc., New York, NY (US)

( * ) Notice: Subject to any disclaimer, the term of this patent is extended or adjusted under 35 U.S.C. 154(b) by 2863 days.

(21) Appl. No.: 11/365,124

(22) Filed: Mar. 1, 2006

(65) Prior Publication Data

US 2007/0209036 A1 Sep. 6, 2007

(51) Int. Cl.
*G06F 9/46* (2006.01)
*G06F 15/173* (2006.01)
*G06F 9/48* (2006.01)
*G06F 9/54* (2006.01)

(52) U.S. Cl.
CPC .............. *G06F 9/4881* (2013.01); *G06F 9/541* (2013.01)
USPC ........... 718/100; 718/102; 718/104; 709/223; 709/224; 709/226

(58) Field of Classification Search
None
See application file for complete search history.

(56) References Cited

U.S. PATENT DOCUMENTS

| | | | | |
|---|---|---|---|---|
| 6,185,221 | B1* | 2/2001 | Aybay | 370/412 |
| 6,438,553 | B1* | 8/2002 | Yamada | 1/1 |
| 7,069,401 | B1* | 6/2006 | Noonan et al. | 711/162 |
| 7,620,706 | B2* | 11/2009 | Jackson | 709/223 |
| 2005/0283782 | A1* | 12/2005 | Lu et al. | 718/100 |
| 2006/0020942 | A1* | 1/2006 | Ly et al. | 718/100 |
| 2006/0190605 | A1* | 8/2006 | Franz et al. | 709/226 |
| 2006/0230405 | A1* | 10/2006 | Fraenkel et al. | 718/104 |

FOREIGN PATENT DOCUMENTS

WO WO 2004/029805 A2 4/2004 ............... G06F 9/46

OTHER PUBLICATIONS

Smith, Chris. "Open source metascheduling for Virtual Organizations with the Community Scheduler Framework (CSF)". Technical whitepaper. Platform Computing, Inc. Aug. 2003.*
"Running Jobs with Platform LSF". User manual. Version 5.1. Jan. 2003.*
BrightStor™ CA-1 Tape Management; Installation and Maintenance Guide, 2003, 5.2 SP04, Computer Associates 18J2L0520NE, 3 pages.
Andrieux, Alain, et al., *Web Services Agreement Specification (WS-Agreement)* Version Sep. 2005, retrieved from http://www.ogf.org/Public_Comment_Docs/Documents/Oct-2005 on Aug. 16, 2007, Sep. 20, 2005, 80 pages.
Kharrat, Dia, et al., *Self-Registering Plug-Ins: An Architecture for Extensible Software*, Electrical and Computer Engineering, 2005, Canadian Conference on Saskatoon, S.A., Canada, May 1-4, 2005, and Piscataway, NJ, USA, IEEE, pp. 1324-1327, May 2005.
Mausolf, Jeff, *Use Community Scheduler Framework to implement grid meta-schedulers*, retrieved from http://www.ibm.com/developerworks/grib/library on Aug. 16, 2007, 5 pages, Jul. 27, 2004.

(Continued)

*Primary Examiner* — Charles Swift
(74) *Attorney, Agent, or Firm* — Baker Botts L.L.P.

(57) ABSTRACT

According to one embodiment of the invention, a method for use in scheduling execution of a computer process includes registering a plurality of scheduling engines available to schedule execution of the computer process. The method also includes receiving a request to schedule execution of a particular computer process, and, in response, selecting one of the plurality of scheduling engines to schedule execution of the particular computer process.

34 Claims, 2 Drawing Sheets

(56) References Cited

OTHER PUBLICATIONS

Waldrich, Oliver, et al., *A Meta-scheduling Service for Co-allocating Arbitrary Types of Resources,* Parallel Processing and Applied Mathematics Lecture Notes in Computer Science, LNCS, Springer-Verlag, BE, vol. 3911, pp. 782-791, Aug. 13, 2005.

Waldrich, Oliver, et al., *A Meta-scheduling Service for Co-allocating Arbitrary Types of Resources,* Global Grid Forum 16 presentation, 13 pages, Feb. 15, 2006.

Gamma, E., et al., *Abstracting Object Creation, Design Patterns: Elements of Reusable Object-Oriented Software:,* Addison Wesley, One Jacon Way, Reading, Massachusets, 4 pages, 1995.

Unknown, *Program of PPAM 2005,* retrieved from http://www.ppam.pcz.pl/ppam2005/program-compl.pdf on Aug. 16, 2007, 11 pages.

Notification of Transmittal of the International Search Report and the Written Opinion of the International Searching Authority, or the Declaration regarding International Application No. PCT/US2007/005344 filed Feb. 28, 2007, Date of Mailing: Mar. 9, 2007.

\* cited by examiner

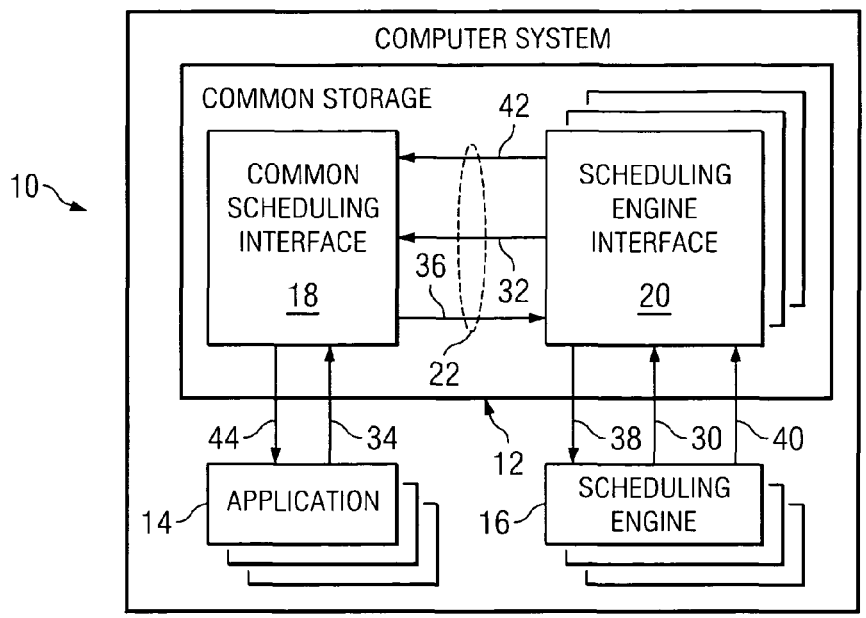
FIG. 1A
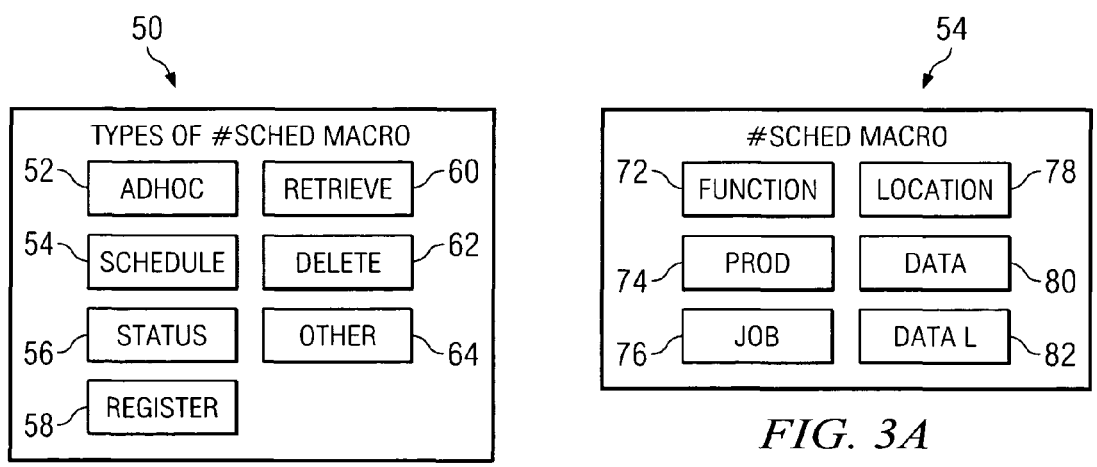
FIG. 2
FIG. 3A
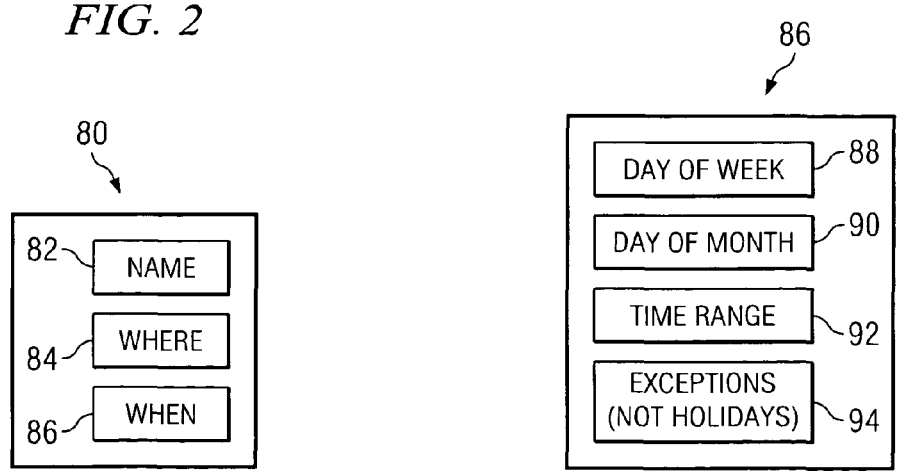
FIG. 3B
FIG. 3C

METHOD AND SYSTEM FOR SCHEDULING COMPUTER PROCESSES USING A COMMON SCHEDULING INTERFACE

TECHNICAL FIELD OF THE INVENTION

This invention relates generally to computer systems and more particularly to a method and system for scheduling computer processes utilizing a common scheduling interface.

BACKGROUND

Computer systems have become critical in today's society. Conventionally large computer systems, and more recently smaller systems, have utilized scheduling engines to schedule execution of computer processes. Scheduling of execution of computer processes is often referred to as job management. Job management may involve scheduling a computer process to occur at one designated time, repeatedly at periodic times, as well as according to other time schedules. Numerous scheduling engines exist today, three of which are available from Computer Associates under the names Unicenter CA-7, Unicenter CA-Scheduler, and Unicenter CA-Job track.

It is not uncommon for a given computer system to utilize more than one type of scheduling engine. This may occur, for example, through the merger of two different companies, and the resulting merger of their computer systems. Often, each different type of scheduling engine is designed to receive instructions to process scheduling requests, with those received instructions being in a particular format. The particular format may differ from the particular format utilized for other scheduling engines. The use of multiple scheduling engines that expect instructions in different formats causes difficulties because, conventionally, this has required each computer application that wishes to request scheduling of a computer process to have an interface for each scheduling engine.

SUMMARY

According to one embodiment of the invention, a method for use in scheduling execution of a computer process includes registering a plurality of scheduling engines available to schedule execution of the computer process. The method also includes receiving a request to schedule execution of a particular computer process, and, in response, selecting one of the plurality of scheduling engines to schedule execution of the particular computer process.

According to another embodiment of the invention, a method of scheduling execution of a computer process includes transmitting a request to execute a computer process to an interface associated with a scheduling engine. The request is in a format not understandable by the scheduling engine. The method also includes translating, by the interface, the request into a format understandable by the scheduling engine. The method also includes scheduling, by the scheduling engine, the computer process.

Embodiments of the invention may provide numerous technical advantages. Some, none, or all embodiments may benefit from the below described advantages. According to one embodiment, a system and method are provided for scheduling execution of job processes that allows multiple types of scheduling engines to be used with multiple applications. In one embodiment, such scheduling can occur without the applications having to know the specific format desired by particular scheduling engines for requesting scheduling of execution of computer processes. This reduces costs associated with application development and deployment.

Other technical advantages will be apparent to one of skill in the art.

BRIEF DESCRIPTION OF THE DRAWINGS

A more complete understanding of embodiments of the invention will be apparent from the detailed description taken in conjunction with the accompanying drawings in which:

FIG. 1A is a block diagram illustrating a computer system according to the teachings of the invention;

FIG. 2 is a block diagram illustrating examples of macros associated with a request to schedule execution of a computer process;

FIG. 3A is a block diagram illustrating component parts of one example of a request to execute a computer process;

FIG. 3B is a block diagram illustrating component parts of the data block of FIG. 3A; and FIG. 3C is a block diagram illustrating component parts of the "when" block of FIG. 3B.

DETAILED DESCRIPTION OF EXAMPLE EMBODIMENTS

Figure 1B:
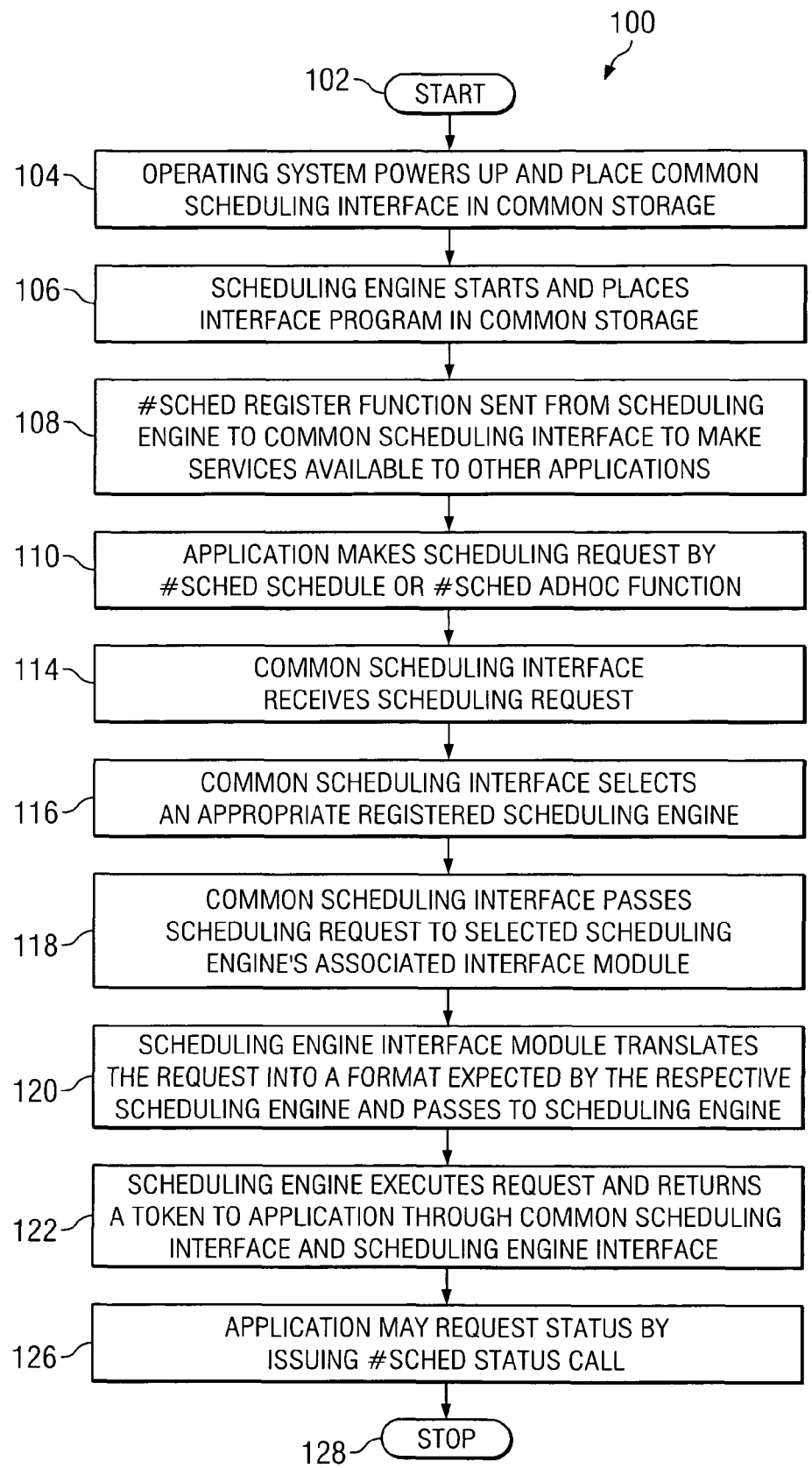
FIG. 1B is a flowchart illustrating example steps associated with a method for scheduling execution of computer processes according to the teachings of the invention.

Example embodiments of the present invention and their advantages are best understood by referring to FIGS. 1 through 3C of the drawings, like numerals being used for like and corresponding parts of the various drawings.

FIG. 1 is a block diagram illustrating a computer system 10 according to the teachings of the invention. In this particular illustrated embodiment, computer system 10 includes a common storage area 12, a plurality of computer applications 14, and a plurality of scheduling engines 16. Common storage area 12 represents a storage area which is accessible by a plurality of different applications 14 and scheduling engines 16. Applications 14 refer to any computer application that may request that a computer process be scheduled for execution. Examples of applications 14 include a tape backup program, project planning tools, and financial tracking tools. Scheduling engines 16 are operable to schedule execution of a computer process. Such scheduling may occur at one designated time, at a plurality of periodic times, a plurality of a periodic times, or according to other alternative schedules. Scheduling engines 16 may include commercially known scheduling engines, examples of which include CA 7, CA Scheduler, and CA Job Track, as well as yet-to-be developed scheduling engines.

Included within common storage area 12 is a common scheduling interface 18 and a plurality of scheduling engine interfaces 20. The teachings of the invention recognize that the use of a plurality of scheduling engines in a computer system may cause difficulties because each scheduling engine often communicates according to a different format or protocol. Thus, requests to schedule execution of job processes must be sent by each of applications 14 in a manner understandable by the particular scheduling engine 16 that will schedule execution of the computer process. According to the teachings of the invention, common scheduling interface 18 and a plurality of scheduling engine interfaces 20 are provided. Collectively, common scheduling interface 18 and scheduling engine interfaces 20 register the plurality of scheduling engines 16 that are available for use by applications 14, select a particular one of scheduling engines 16 to schedule execution of a particular job requested by application 14, and translate the request from application 14 into a format suitable for receipt by the particular selected scheduling engine. In this manner, multiple scheduling engines can be used without modifying each of applications 14 to request scheduling of computer processes in a particular format.

As described in greater detail below, common scheduling interface 18 is operable to receive a request to schedule execution of a computer process from applications 14, and in response, select a particular one of scheduling engines 16 to schedule execution of the computer process. Scheduling engine interface 20 is operable to receive the request to schedule execution of the computer process from common scheduling interface 18 and translate that request into a format suitable for the particular selected scheduling engine 16. It is noted that the request provided by application 14 to schedule execution of the computer process may also be provided directly to scheduling engine interface 20. In one embodiment, common scheduling interface 18 and scheduling engine interfaces 20 are logic encoded in computer-readable medium, one example of which is a computer program stored on media, such as a hard drive, random access media, or other similar media. Additional details are provided with respect to FIG. 1B.

FIG. 1B is a flowchart providing example steps associated with a method for scheduling execution of a computer process in the computer system of FIG. 1A. This method is described with reference to both FIGS. 1A and 1B. It is noted, however, that this method may also be applied in computer systems that differ from as illustrated in FIG. 1A.

The method begins step 102. At step 104, the operating system of computer system 10 powers up and places common scheduling interface 18 into common storage area 12. At step 106, one or more of scheduling engines 16 initialize, and an associated scheduling interface for each type of scheduling engine is placed in common storage 12. One scheduling engine interface may alternatively be provided for each scheduling engine 16, rather than merely each type of scheduling engine 16. At step 108, each of scheduling engines 16 sends a message to common scheduling interface 18 indicating that it is available to schedule execution of computer processes. This message may be sent, in some embodiments, directly to common scheduling interface; however, in this embodiment, the message is transmitted through scheduling engine interface 20 and then on to common scheduling interface 18. This registration message is indicated by reference numeral 30 and 32. In one particular embodiment, this registration message may be implemented by a #SCHED Register function in IBM's High Level Assembler (HLASM) programming language; however, other messages in other programming languages may be utilized. Once scheduling engines 16 have registered with common scheduling interface 18, execution of computer processes may occur.

At step 110, an application 14 makes a scheduling request by sending a scheduling request message to common scheduling interface 18. This scheduling request is indicated by reference numeral 34 on FIG. 1A. In one example, the scheduling request is in the form of #SCHED SCHEDULE or #SCHED ADHOC. As described in greater detail below, #SCHED SCHEDULE refers to a scheduling request for execution of a computer process on a particular schedule, while #SCHED ADHOC refers to scheduling of a one-time execution of a computer process. It should be emphasized, however, that these are merely examples of a particular implementation of a scheduling request. In one particular example, the scheduling request includes the name of the job to be scheduled, the location where the job should be executed, such as on which processor the job should be executed, and when the job should be executed. Additional details of example implementations of the information contained in a scheduling request are described in greater detail below in conjunction with FIGS. 3A-3C.

At step 114, common scheduling interface 18 receives the scheduling request indicated by reference numeral 34. In response, common scheduling interface 18 selects an appropriate registered scheduling engine 16 for scheduling execution of the computer process identified in scheduling request 34. In some embodiments, particular ones of scheduling engines 16 may be suitable for scheduling execution of the job process designated in scheduling request 34, while other scheduling engines 16 may not be appropriate. In other embodiments, any of scheduling engines 16 may be appropriate but the selection of the particular scheduling engine may depend on a variety of factors, including location of scheduling engine 16, how busy scheduling engine 16 is, and the preferences of the administrator of the computer system 10 and the scheduling engines 16.

At step 118, common scheduling interface 18 passes a scheduling request to the scheduling engine interface 20 associated with the selected scheduling engine 16, as indicated by reference numeral 36. In one embodiment, this involves simply passing the scheduling request designated by reference numeral 34 from application 14 to common scheduling interface 18. In another example, this involves sending a request based on request 34, but containing the information necessary to schedule the associated computer process. At step 120, the scheduling engine interface 20 associated with the selected scheduling engine 16 translates the received request into a format expected by the respective scheduling engine and passes the result to scheduling engine 16, as indicated by reference numeral 38. Additional details of such a translation are described in greater detail below in conjunction with FIG. 3C.

At step 122, scheduling engine 16 executes the scheduling request and returns a token with information regarding the scheduled request to application 14. In one example, the token is transmitted to application 14 through common scheduling engine interface 20 and common scheduling interface 18, as designated by reference numerals 40 and 42. In other embodiments, this token may be transmitted directly from scheduling engine 16 to application 14 without going through scheduling engine interface 20 and common scheduling interface 18. In one example, the token includes information that identifies the product that processed the request, the specific instance of the product that processed the request, and the specific job processed within that instance. In this regard, product refers to the particular scheduling engine 16 that processed the request.

At step 126, application 14 may request a status of the scheduled job by issuing a status request message through common scheduling interface 18 and scheduling engine interface 20. In one particular example, this request may take the form of #SCHED STATUS call. The method concludes at step 126.

Thus, according to the teachings of the invention, a common scheduling interface 18 may receive scheduling requests, as well as additional requests, such as status requests, from a plurality of different applications and direct those requests to a selected scheduling engine for processing. A scheduling engine interface associated with respective ones of scheduling engine 16 provides translation capabilities such that applications 14 can submit a scheduling request in a common format, without knowing the specific format protocols for communicating with each individual scheduling engine 16. In some embodiments, this allows applications 14 to utilize a plurality of scheduling engines 16 without modification of applications 14 to generate scheduling requests in a format particular to each scheduling engine 16, which saves associated cost and time.

FIG. 2 is a block diagram illustrating a plurality of types of scheduling macros 50 that may be used according to the teachings of the invention. As illustrated, macros 50 include an ad hoc macro 52, a schedule macro 54, a status macro 56, a register macro 58, a retrieve macro 60, a delete macro 62, and other macros 64. In general, macros 50 refer to various messages that may be sent by applications 14 and/or scheduling engine 16 regarding scheduling of computer processes for execution. These particular macros may be useful in one embodiment of the invention; however, other embodiments may utilize only some or none of these macros.

ADHOC macro 52 refers to a scheduling message that adds a job to be run one time only. According to one embodiment, an ADHOC request may specify predecessor or successor jobs that must take place before or after the job to be run executes. The SCHEDULE macro 54 defines a job to be run on a regular basis, such as every Friday at 4:00 p.m. The request may specify predecessor or successor jobs. If the job is already defined, then the new information replaces the existing definition. STATUS macro 56 retrieves the current state of a job added by the ad hoc or schedule macros. The status information may include information such as "job not yet started," "job is currently executing," "job has failed," and "job is complete." The REGISTER macro 58 allows registration of scheduling engines 16 with common scheduling interface 18, informing common scheduling interface 18 that the particular scheduling engine 16 is available to schedule execution of computer processes. The RETRIEVE macro 60 retrieves the schedule of a job, as defined by the SCHEDULE macro 54. The DELETE macro 62 removes a job from both the workload and from the associated database for both current and future executions. OTHER macro 64 represents other macros that may be useful in scheduling computer processes.

In one embodiment, each of the macros 50 appear the same regardless of the type of scheduling engine 16 utilized. For example, the schedule macro 54 will include the same information for a Unicenter CA 7 scheduling engine as it would for a Unicenter CA Scheduler scheduling engine. To effect this, scheduling engine interfaces 20 are operable to translate these general macros generated by applications 14 into a format understandable to the particular protocol utilized by scheduling engine 16.

FIG. 3A is a block diagram illustrating a plurality of components of an example SCHEDULE macro 54. These components include a FUNCTION component 72, a PRODUCT component 74, a JOB component 76, a LOCATION component 78, a DATA component 80, and a DATA LINK component 82. FUNCTION component 72 is a positional key word describing what the application wants the scheduling engine to do. Examples of positional key words are the words corresponding to the macros 50 described in conjunction with FIG. 2, such as "ADHOC" and "SCHEDULE." PRODUCT component 74 is a literal naming of the specific instance of the application 14 issuing the request. For example, if the second copy of a product CA-XYZ is making a scheduling request, it might specify PROD="CA-XYZ-2." JOB component 76 specifies the name of a job for the request. LOCATION component 78 specifies for schedule and ad hoc requests, the location of the job. An example location of a job is the name of the file where the job can be found by the scheduling engine 16, such as "LIBRARY.NAME (MEMBER)." This location refers to the location of the job that the application wants executed. DATA component 80 is used for schedule and ad hoc requests and specifies the location of the scheduled data and when a job should execute. For status and retrieve requests, this specifies where the result of the request should be stored. DATA LENGTH component 82 specifies the length of DATA component 80.

FIG. 3B is a block diagram illustrating additional details of DATA component 80, according to one example. As described above, DATA component 80 specifies certain data about execution of a scheduled job. In particular, DATA component 80 includes a NAME component 82, a WHERE component 84, and a WHEN component 86. NAME component 82 specifies the name of the job to be executed. WHERE component 84 specifies the name of the computer at which the job specified by NAME component 82 should be executed, which may be computer system 10 or some other computer. WHEN component 86 designates when a particular job should be executed. WHEN component 86 may designate a one time execution time, a periodic execution time, an aperiodic execution time, as well as exceptions to any of the above. Additional details of WHEN component 86 are illustrated in FIG. 3C.

FIG. 3C is a block diagram illustrating additional components of WHEN component 86. To facilitate translations of requests received by scheduling engines 16, the types of requests, and in particular the types of scheduling requests, may be limited to a common subset of functionality provided by the plurality of scheduling engines 16. This is effected, in one example, by selection of what may be specified in WHEN component 86. One example of which is described in connection with FIG. 3C. As illustrated, WHEN component 86 may specify the Day of Week 88, the Day of Month 90, a Time Range 92, as well as Exceptions 94. The Day of Week example may specify that the process named by NAME component 82 should execute every Wednesday at 3:30 p.m. Whereas the Day of Month component 90 may specify that the process should be executed on the third Wednesday of each month. Time Range 92 component may specify that a particular process should occur within a certain time range. The Exceptions component 94 may specify that a job should execute according to any of the above described periodic or a periodic approaches but that certain exceptions should apply, an example of which is that a particular process should run on every Friday except for holidays.

Although the present invention and its advantages have been described in detail, it should be understood that various changes, substitutions, and alterations can be made therein without departing from the spirit and scope of the invention as defined by the appended claims.

What is claimed is:

1. A method for scheduling execution of a computer process comprising:

registering a plurality of scheduling engines with a common scheduling interface;

transmitting to the common scheduling interface a request to execute the computer process, the request including an identifier of the computer process, a location for execution of the computer process, and information regarding when the computer process should be executed;

identifying a scheduling engine from the plurality of scheduling engines based on the location for execution of the computer process;

selecting, by the common scheduling interface, the identified scheduling engine to schedule execution of the computer process;

transmitting the request to execute the computer process from the common scheduling interface to a scheduling engine interface associated with the selected scheduling engine;

translating, by the scheduling engine interface, the request to execute into a format recognizable by the selected scheduling engine and transmitting the translated request to the selected scheduling engine;

and receiving at the selected scheduling engine the translated request and, in response, scheduling, by the selected scheduling engine, execution of the computer process.

2. The method of claim 1, wherein the information regarding when the computer process should be executed comprises information selected from the group consisting of the day of the week the computer process should be executed, the day of the month the computer process should be executed, and a time range when the computer process should be executed.

3. The method of claim 1, wherein the request to execute comprises an ad hoc request.

4. The method of claim 1, wherein the request to execute the computer process comprises a schedule request.

5. The method of claim 1, wherein transmitting to the common scheduling interface a request to execute the computer process comprises transmitting from a computer application to the common scheduling interface a request to execute the computer process.

6. The method of claim 5, and further comprising transmitting a token containing information regarding the selected scheduling engine from the selected scheduling engine through the scheduling engine interface, through the common scheduling interface, to the application.

7. The method of claim 1, wherein the plurality of scheduling engines comprise a scheduling engine selected from the group consisting of CA 7, CA Scheduler, and CA Job Track.

8. The method of claim 1, and further comprising:
transmitting a status request regarding the computer process through the common scheduling interface, through the scheduling engine interface, to the selected scheduling engine; and
receiving, in response, status information regarding the computer process.

9. A method for scheduling execution of a computer process comprising:
receiving a request to schedule execution of a computer process;
identifying a scheduling engine from a plurality of scheduling engines based on a location for execution of the computer process;
transmitting a request to execute the computer process to an interface associated with the identified scheduling engine, the request being in a format not understandable by the scheduling engine;
translating, by the interface, the request into a format understandable by the scheduling engine; and
scheduling, by the scheduling engine, execution of the computer process.

10. The method of claim 9, and further comprising receiving the request to execute a computer process at a common scheduling interface before the request is transmitted to the interface associated with the scheduling engine.

11. The method of claim 9, and further comprising transmitting, by the scheduling engine, status information regarding the scheduled computer process.

12. The method of claim 9, and further comprising transmitting, by the scheduling engine, a token, the token having information regarding the scheduling engine that processed the request to execute a computer process.

13. The method of claim 12, wherein the information comprises an identity of the product that processed the request.

14. The method of claim 9, wherein the request to execute is selected from a group consisting of a scheduled execution and an ad hoc execution.

15. A method for use in scheduling execution of a computer process comprising:
registering a plurality of scheduling engines available to schedule execution of computer processes;
receiving a request to schedule execution of a particular computer process;
identifying a scheduling engine from the plurality of scheduling engines based on a location for execution of the particular computer process; and
selecting the identified scheduling engine schedule execution of the particular computer process.

16. The method of claim 15, wherein the plurality of scheduling engines comprises at least two different types of scheduling engines.

17. The method of claim 16, wherein the plurality of scheduling engines comprises a CA 7 Scheduling Engine, a CA Scheduler Scheduling Engine, and a CA Job Track Scheduling Engine.

18. The method of claim 15, wherein the plurality of scheduling engines comprises a scheduling engine other than a CA 7 Scheduling Engine, a CA Scheduler Scheduling Engine and a CA Job Track Scheduling Engine.

19. The method of claim 15, further comprising translating the request to schedule execution of a particular computer process to a format understandable by the selected scheduling engine.

20. The method of claim 15, and further comprising generating, by the scheduling engine, a token containing information regarding the selected scheduling engine.

21. The method of claim 15, wherein the request to schedule execution of a particular computer process comprises a request including an identifier of the computer process, a location for execution of the computer process, and information regarding when the computer process should be executed.

22. The method of claim 19, wherein translating a request to schedule execution of a particular computer process into a format understandable by a plurality of scheduling engines comprises performing the translation by a common scheduling interface associated with the selected scheduling engine.

23. An apparatus comprising:
a non-transitory computer readable storage media comprising logic operable, when executed on a processor to:
register a plurality of scheduling engines available to schedule execution of computer processes;
receive a request to schedule execution of a particular computer process;
identify a scheduling engine from the plurality of scheduling engines based on a location for execution of the particular computer process; and
select the identified scheduling engine to schedule execution of the particular computer process.

24. The apparatus of claim 23, wherein the plurality of scheduling engines comprises at least two different types of scheduling engines.

25. The apparatus of claim 24, wherein the plurality of scheduling engines comprises a CA 7 Scheduling Engine, a CA Scheduler Scheduling Engine, and a CA Job Track Scheduling Engine.

26. The apparatus of claim 23, wherein the plurality of scheduling engines comprises a scheduling engine other than a CA 7 Scheduling Engine, a CA Scheduler Scheduling Engine and a CA Job Track Scheduling Engine.

27. The apparatus of claim 23, wherein the logic is further operable to translate the request to schedule execution of a particular computer process to a format understandable by the selected scheduling engine.

28. The apparatus of claim 23, wherein the logic is further operable to generate, by the scheduling engine, a token containing information regarding the selected scheduling engine.

29. The apparatus of claim 23, wherein the request to schedule execution of a particular computer process comprises a request including an identifier of the computer process, a location for execution of the computer process, and information regarding when the computer process should be executed.

30. The apparatus of claim 27, wherein the logic is further operable to translate a request to schedule execution of a particular computer process into a format understandable by a plurality of scheduling engines by translating by a common scheduling interface associated with the selected scheduling engine.

31. A computer system comprising:
 a computer application;
 a common scheduling interface;
 a plurality of scheduling engines;
 a plurality of scheduling engine interfaces associated with respective ones of the plurality of scheduling engines; and wherein the common scheduling interface is operable to:
 register the plurality of scheduling engines;
 identify a scheduling engine from the plurality of scheduling engines based on a location for execution of the particular computer process; and
 select the identified scheduling engine to execute scheduling of a particular computer process requested by the computer application; and
 transmit to the scheduling engine interface associated with the selected scheduling engine a request to schedule the particular computer process, the request being in a format not understandable by the selected scheduling engine; and
 wherein the respective scheduling engine interface associated with the selected scheduling engine is operable to translate the request into a format understandable by the selected scheduling engine.

32. The computer system of claim 31, wherein the computer application is a tape backup application.

33. The computer system of claim 31, wherein the plurality of scheduling engines comprise a scheduling engine selected from the group consisting of CA 7, CA Scheduler and CA Job Track.

34. The computer system of claim 31, wherein each of the plurality of scheduling engines is operable to generate a token including information regarding the men scheduling engine that scheduled a particular computer process, the specific instance of the scheduling engine scheduled the particular process, and the particular computer process.

\* \* \* \* \*